Oct. 4, 1932.  J. R. THORP  1,880,583
PEDAL
Filed June 18, 1931
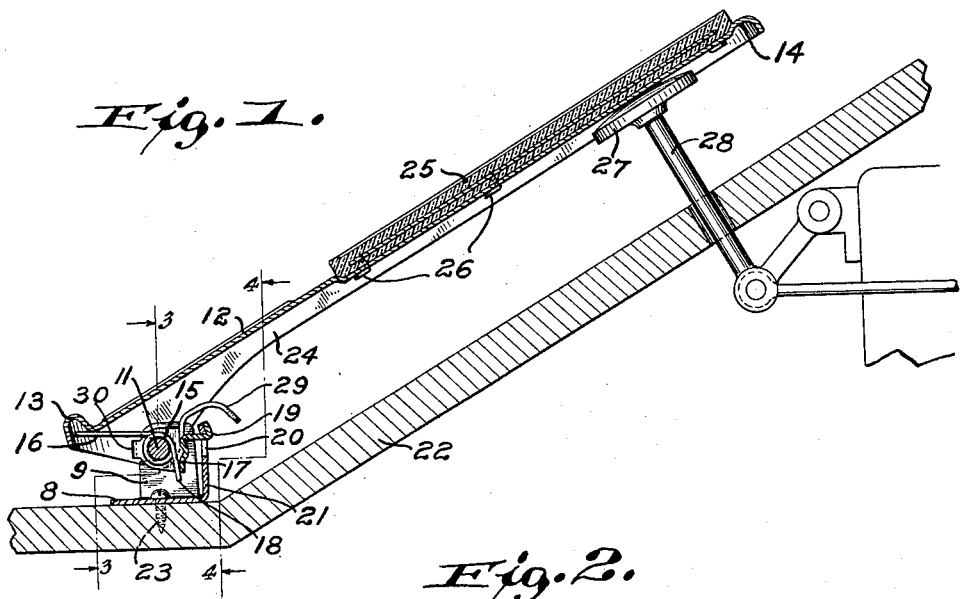
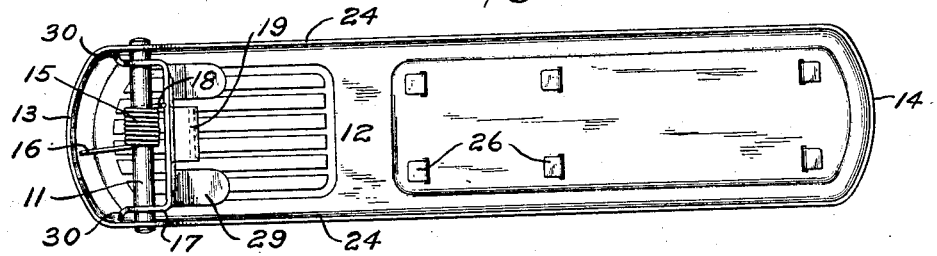
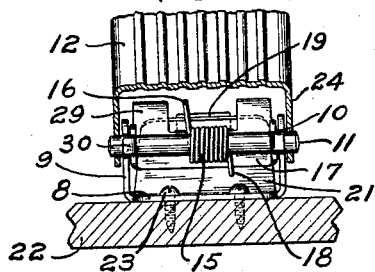
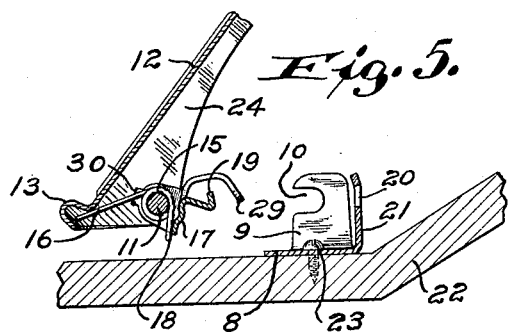
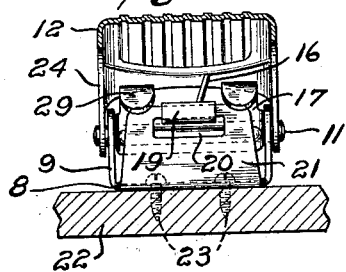
INVENTOR.
BY J. R. Thorp.
Morsell & Morsell
ATTORNEY.

Patented Oct. 4, 1932

1,880,583

UNITED STATES PATENT OFFICE

JOEL R. THORP, OF WEST ALLIS, WISCONSIN, ASSIGNOR TO THE FULTON COMPANY, OF WEST ALLIS, WISCONSIN, A CORPORATION OF WISCONSIN

PEDAL

Application filed June 18, 1931. Serial No. 545,236.

This invention relates to improvements in the construction and operation of foot lever or pedal structures for actuating or controlling the operation of various kinds of mechanisms such as the accelerators of automobile engines and the like.

An object of the invention is to provide an improved pedal structure, which is simple and durable in construction, and which may be readily assembled or dismantled at will and without the use of tools.

Another object of the invention is to provide various improvements in the construction of automobile accelerator pedals of the type disclosed and claimed broadly in co-pending application Serial No. 401,431, filed October 22, 1929.

A further object of the invention is to provide a pedal attachment which will permit convenient application of the pedal to and removal thereof from its normal support, and whereby accidental release of the pedal from its support is impossible.

Still another object of the invention is to provide a pedal assemblage which presents a neat and compact appearance, and the parts of which may be manufactured in quantity at minimum cost with the aid of punches and dies.

These and other objects and advantages will be apparent from the following detailed description.

A clear conception of one embodiment of the invention in an automobile accelerator pedal structure, may be had by referring to the drawing accompanying and forming a part of this specification in which like reference characters designate the same or similar parts in the various views:

Fig. 1 is a longitudinal vertical section through one of the improved pedal structures, showing the same fully assembled and associated with the floor boards and with the accelerator control rod of an automobile;

Fig. 2 is a bottom view of the pedal of the structure shown in Fig. 1, showing the pivot pin, spring, and retainer associated therewith;

Fig. 3 is a transverse vertical section through the pedal, taken along the line 3—3 of Fig. 1, looking forwardly;

Fig. 4 is a transverse vertical section through the pedal, taken along the line 4—4 of Fig. 1, looking rearwardly; and Fig. 5 is a fragmentary longitudinal vertical section through the pedal and its supporting bracket, showing these elements dismantled.

The improved pedal structure shown in the drawing, comprises in general a bracket 8 having integral upstanding laterally spaced ears 9 provided with rearwardly open notches 10; a transverse pivot pin 11 engageable with the notches 10; a pedal 12 supported at its medial portion upon the extreme ends of the pin 11 and having heel and toe portions 13, 14 respectively normally disposed rearwardly and forwardly of the ears 9; a coil spring 15 embracing the pin 11 and having an end 16 coacting with the rear heel portion 13 of the pedal 12; and a pedal retainer or holder 17 carried by the pin 11 between the ears 9 and coacting with the opposite end 18 of the spring 15, the holder 17 having a forwardly extending hooked projection 19 cooperable with an opening 20 in the forward wall 21 of the bracket to hold the pedal 12 and bracket 8 in assembled position.

The bracket 8 with its integral ears 9 and front wall 21, is preferably stamped from a single sheet of metal, and may be attached to a floor board 22 by means of screws 23 or the like. The opening 20 in the wall 21 is disposed between the ears 9 and substantially in horizontal alinement with the rearwardly open notches 10, as shown in Figs. 1 and 5, and the upper portion of the wall 21 may be bent rearwardly to a slight extent as shown, in order to insure better interlocking of the assembled elements.

The pivot pin 11 which may be formed of rod stock cut to suitable length, is rigidly attached to the side walls 24 of the pedal 12 by riveting or otherwise, and is rotatable within the notches 10 during swinging of the pedal. The pedal 12 together with its side walls 24, is likewise preferably stamped from a single sheet of metal, and the forward or toe portion 14 of the pedal, may be provided with a rubber foot pad 25 secured in place by means of cleats 26. The lower surface of the toe portion 14 of the pedal 12, normally coacts with the button 27 of an accelerator rod 28, and the spring end 16 coacting with the heel portion 13 constantly urges the toe portion 14 downwardly against the button 27 but with insufficient force to actuate the accelerator rod 28.

The pedal retainer or holder 17 together with its hooked projection 19 and forwardly projecting manipulating extensions 29, is also preferably stamped from a single sheet of metal, and is swingably supported upon the pivot pin 11 between the ears of the bracket 8. The holder 17 is moreover provided with spacing lugs 30 which are cooperable with the pedal side walls 24 to retain the holder centralized upon the supporting pin 11. The spring end 18 constantly urges the hooked projection 19 of the holder 17 toward the pedal 12, and the extensions 29 serve as means for compressing the spring 15 and for retracting the projection 19 from the pedal during assembly and dismantling of the structure.

In order to assemble the pedal 12 upon the bracket 8, it is only necessary to compress the coil spring 15 by forcing the extensions 29 of the holder 17 away from the pedal 12, as shown in Fig. 5. With the holder 17 thus disposed, the pedal 12 may be brought forward until the hooked projection 19 passes through the opening 20 of the wall 21, and the pivot pin 11 enters the notches 10. Upon subsequent release of the extensions 29, the hook of the projection 19 engages the upper edge of the opening 20 as shown in Fig. 1, thereby locking the pin 11 within the notches 10. With the elements thus assembled, the spring 15 is at all times effective to simultaneously urge the hook of the projection 19 into locking engagement with the wall 21, and to force the toe portion 14 of the pedal 12 downwardly against the accelerator button 27 with sufficient pressure to avoid rattling due to loose coaction between the parts. When the pedal 12 has been entirely removed from the bracket 8 and the extensions 29 have been released, the outermost ends of these extensions are forced by the spring 15 into coaction with the bottom of the pedal 12, thus maintaining the holder 17 in readiness for future assembly of the parts, and the lugs 30 insure proper centralization of the holder 17 between the walls 24, at all times.

From the foregoing description, it will be apparent that with the structure assembled, the pedal 12 may be utilized to actuate the accelerator, and that the spring 15 in no manner interferes with such operation. The spring 15 embracing the pivot pin 11 provides simple and effective means for maintaining the parts assembled while preventing accidental displacement of the pin 11 from within the notches 10. The pedal 12, may however be readily removed from or attached to the bracket 8, at will and without the aid of any tools. The bracket 8, pedal 12 and holder 17 may be readily manufactured in quantity and at minimum cost, with the aid of punches and dies, and all of the elements may be plated and polished to present an extremely neat appearance.

It should be understood that it is not desired to limit the invention to the exact details of construction herein shown and described, for various modifications within the scope of the claims may occur to persons skilled in the art.

It is claimed and desired to secure by Letters Patent:

1. In combination, a bracket having rearwardly open notches and a wall provided with a downwardly exposed edge disposed in substantial alinement with said notches, a pin coacting with said notches, a pedal swingable about said pin above said bracket, a spring for urging said pedal in one direction, and a holder coacting with said spring and cooperable upwardly with said edge to retain said pin within said notches.

2. In combination, a bracket having rearwardly open notches and a wall provided with a downwardly exposed edge disposed in substantial alinement with said notches, a pin coacting with said notches, a pedal swingable at its medial portion about said pin and extending over said bracket edge, a spring coacting with the rear heel portion of said pedal to urge the front toe portion thereof downwardly, and a holder coacting with said spring and cooperable upwardly with said edge to retain said pin within said notches.

3. In combination, a bracket having rearwardly open notches and a transverse wall located in front of said notches and provided with an opening in substantial alinement with said notches, a pin coacting with said notches, a pedal swingable about said pin, a spring for urging said pedal in one direction, and a holder coacting with said spring and having a hooked projection extending through said opening and cooperable with said wall to retain said pin within said notches.

4. In combination, a bracket having rearwardly open horizontal notches and a transverse wall located between and in front of said notches and provided with an opening in horizontal alinement with said notches, a pin coacting with said notches, a pedal swingable about said pin, a spring coacting with the rear heel portion of said pedal to urge the front toe portion thereof downwardly, and a holder coacting with said spring and having a forwardly extending hooked portion disposed within said opening and cooperable with an upper edge thereof to retain said pin within said notches.

5. In combination, a bracket having open notches, a pin coacting with said notches, a pedal swingable about said pin, a spring coacting with the heel portion of said pedal, and a holder coacting with said spring and with said bracket to retain said pin within said notches, said pin being removable from said notches upon compression of said spring and movement of said holder away from said pedal.

6. In combination, a bracket having rearwardly open notches, a pin coacting with said notches, a pedal swingable about said pin, a spring coacting with the heel portion of said pedal to normally urge the toe portion thereof downwardly, and a holder coacting with said spring and having a hooked portion engageable with said bracket to retain said pin within said notches, said pin being rearwardly removable from said notches upon compression of said spring and displacement of said pedal away from said holder.

7. In combination, a bracket having laterally spaced ears provided with rearwardly open notches and also having a wall provided with an opening disposed in the space between said ears, a pedal having a supporting pivot coacting with said notches, a holder carried by said pin and having a hooked projection extending through said opening and engaging said wall, and a spring for holding the elements assembled and for urging the forward portion of said pedal downwardly.

8. In combination, a bracket having laterally spaced ears provided with rearwardly open notches and also having a wall provided with an opening disposed in the space between said ears, a pedal having a supporting pivot coacting with said notches, a holder carried by said pin and having a hooked projection extending through said opening and engaging said wall, and a spring for holding the elements assembled and for urging said projection toward the forward portion of said pedal and into engagement with the upper edge of said opening.

9. In combination, a bracket having laterally spaced ears provided with rearwardly open notches and also having a wall provided with an opening disposed in the space between said ears, a pedal having a supporting pivot coacting with said notches, a holder carried by said pin and having a hooked projection extending through said opening and engaging said wall, and a spring for holding the elements assembled and for urging the forward portion of said pedal downwardly, said pin being removable from said notches upon compression of said spring and movement of said holder away from said pedal.

10. In combination, a bracket having laterally spaced ears provided with rearwardly open notches and also having a wall provided with an opening disposed in the space between said ears, a pedal having a supporting pivot coacting with said notches, a holder carried by said pin and having a hooked projection extending through said opening and engaging said wall, and a spring for holding the elements assembled and for urging said projection toward the forward portion of said pedal and into engagement with the upper edge of said opening, said pin being rearwardly removable from said notches upon compression of said spring and displacement of said pedal away from said holder.

In testimony whereof, I affix my signature.

JOEL R. THORP.